United States Patent [19]

Harvey

[11] Patent Number: 4,806,197

[45] Date of Patent: Feb. 21, 1989

[54] CONTINUOUS MOTION ROUND BOTTLE TURRET

[75] Inventor: Albert J. Harvey, Fairfield, Ohio

[73] Assignee: Dinagraphics, Inc., Cincinnati, Ohio

[21] Appl. No.: 15,887

[22] Filed: Feb. 18, 1987

[51] Int. Cl.[4] .......................... B65C 9/04; B32B 1/00; B44C 1/00

[52] U.S. Cl. .................................... 156/449; 156/238; 156/456; 156/476; 156/542; 156/DIG. 26

[58] Field of Search ............... 156/230, 238, 240, 361, 156/446, 448, 449, 455, 456, 540, 541, 542, 497, DIG. 24, DIG. 26, 447, 458, 475, 476

[56] References Cited

U.S. PATENT DOCUMENTS

| | | | |
|---|---|---|---|
| 3,979,247 | 9/1976 | Berg | 156/238 |
| 4,019,935 | 4/1977 | Harvey | 156/361 |
| 4,021,286 | 5/1977 | Amberg | 156/446 |
| 4,239,569 | 12/1980 | Harvey | 156/542 |
| 4,239,570 | 12/1980 | Kerwin | 156/238 |
| 4,290,519 | 9/1981 | Harvey | 156/361 |
| 4,315,795 | 2/1982 | Jodrey et al. | 156/361 |
| 4,399,178 | 8/1983 | Barta | 156/238 |
| 4,539,063 | 9/1985 | Cué et al. | 156/238 |
| 4,545,832 | 10/1985 | Hoffmann | 156/446 |

*Primary Examiner*—Michael W. Ball

*Assistant Examiner*—Louis Falasco

*Attorney, Agent, or Firm*—Kenyon & Kenyon

[57] ABSTRACT

An apparatus for decorating the cylindrical surface of an article, such as a bottle, with a label, which includes a turret for transporting the article and a label from a loading to an unloading location while simultaneously rotating the article around its own axis which facilitates the label to be transferred to the cylindrical surface of the bottle. The turret also includes nozzles which engage each article at the decorating station. Furthermore, air may be blown into the article through the nozzle to support the article in instances when said article is made of a plastic or other deformable material.

19 Claims, 3 Drawing Sheets

CONTINUOUS MOTION ROUND BOTTLE TURRET

BACKGROUND OF THE INVENTION a. Field of the Invention

This invention relates generally to a heat transfer labeling apparatus and a method of applying a heat transferable label to a hollow article. More particularly, this invention relates to such an apparatus and method wherein round or cylindrical articles such as bottles are decorated in a continuous operation.

b. Description of the Prior Art

Numerous decorating techniques are known in the art, some of which include the application of a label onto a hollow article to be decorated. One of the techniques which is desirable in this type of decorating is the usage of a heat transferable label which includes a decorative predetermined design thereon and may thus be transferred onto the article or container being decorated.

The heat transfer process permits for multicolored designs to be applied to a container in a single operation. The heat transfer process involves the use of a release-coated carrier upon which the design to be transferred is printed. The design is transferred from the web-like carrier to the container generally by using a combination of heat and pressure. The principal advantage of the heat transfer technique is that multicolored designs of an infinite variety may be applied to a container.

Because of the heat requirement associated with the release and application of the label from the web onto the container, it has been generally accepted practice to maintain the container in a stationary position, albeit rotatable in the instances of circular containers, during the decorating step. This has resulted in numerous prior art types of apparatus which employ intermittently moving mechanisms for conveying a container to a decorating station, engaging the container while a label is applied to the container, and then removing the container from the decorating station.

In U.S. Pat. Nos. 4,239,569, 4,275,856 and 4,290,519 by the present inventor, apparatus are disclosed which overcome some of the disadvantages of the prior art described above. In these apparatus, the articles and the label carrying web travel in two substantially parallel planes at the same speed to allow the transfer of the label in motion. However, the articles decorated by these machines must have relatively flat label-carrying surfaces.

U.S. Pat. No. 4,019,935, also by the present inventor, discloses an apparatus in which bottles placed on a turret pass by a decorating station. At the station, labels from a web are transferred by a relatively flat and stationary presser to the bottles. In this machine, however, only a minor portion of the bottle surface facing the stationary presser can be used to hold a label and therefore the size of the label is limited. Thus, this machine could not generally be used to affix a label extending around substantially the entire circumference of the bottle.

SUMMARY OF THE INVENTION

Briefly stated, the invention herein disclosed provides an apparatus for continuously applying heat transfer labels carried on an elongated web to individual round or cylindrical articles or containers to be decorated. Included in the apparatus is a conveying means which continuously conveys the articles to a decorating station including a plurality of receptacle means suitable for receiving and holding the articles to be decorated as they pass therethrough. The receptacle means containing the articles to be decorated are continuously driven at the decorating station at the same speed as the label carrying web. Additionally, the receptacles also rotate the articles with respect to the web, to allow the label to be applied on a cylindrical surface of the articles. Means are provided for heating the labels carried on the web prior to their arrival at the decorating station. At the decorating station, means are provided for engaging and inflating the article as well as means for urging the heated label into engagement with the article to be decorated. Downstream of the decorating station is positioned a further conveying means to carry the decorated articles away from the decorating station.

In one of the embodiments of the invention, a vacuum chamber is disposed beneath the conveying means which itself includes a plurality of openings therein. In this manner a vacuum is applied to the bottom of the article being carried along on the conveying means thus restricting and stabilizing its movement. The article is fed from the conveying means in a spaced relationship into the receptacle means by means of a worm screw and a star-wheel disposed adjacent the conveying means. The worm screw is provided with a suitable pitch permitting the engagement of the article to be decorated and movement from the conveying means into the receptacle means with the pitch of the worm screw and the star-wheel being synchronized to that of the spacing between receptacle means.

The decorating station preferably comprises a rotating turret which supports the receptacles, as well as the means for heating and applying the labels to the articles. A sun gear synchronized with the web is used to drive a plurality of planetary gears coupled to the receptacles for the rotation of the articles with respect to the web.

The decorating station is also provided with a plurality of nozzles disposed above each of the receptacles and coupled to an external air supply. The nozzles are movable vertically up or down by a cam arrangement for selectively engaging the necks of articles disposed in the receptacles. The nozzles are used to inflate the articles (if required) to stiffen the article side surface during the application of the labels.

Underneath the receptable means there is provided an article shifting means for shifting the articles vertically with respect to the receptacles. The article shifting means are synchronized with the nozzles to accept articles at a first loading station along the turret and to dislocate the articles from the receptacle means at a second or discharging location.

Accordingly, it is the object of the present invention to provide an effective and reliable method of and apparatus for transferring label decorations to cylindrical or round objects.

A further objective is to provide an apparatus in which articles are moved continuously without any intermittent operation.

These and other objects of the invention shall become apparent from the following description of the invention, taken in conjunction with the drawings.

DESCRIPTION OF THE PREFERRED EMBODIMENT

Figure 1:
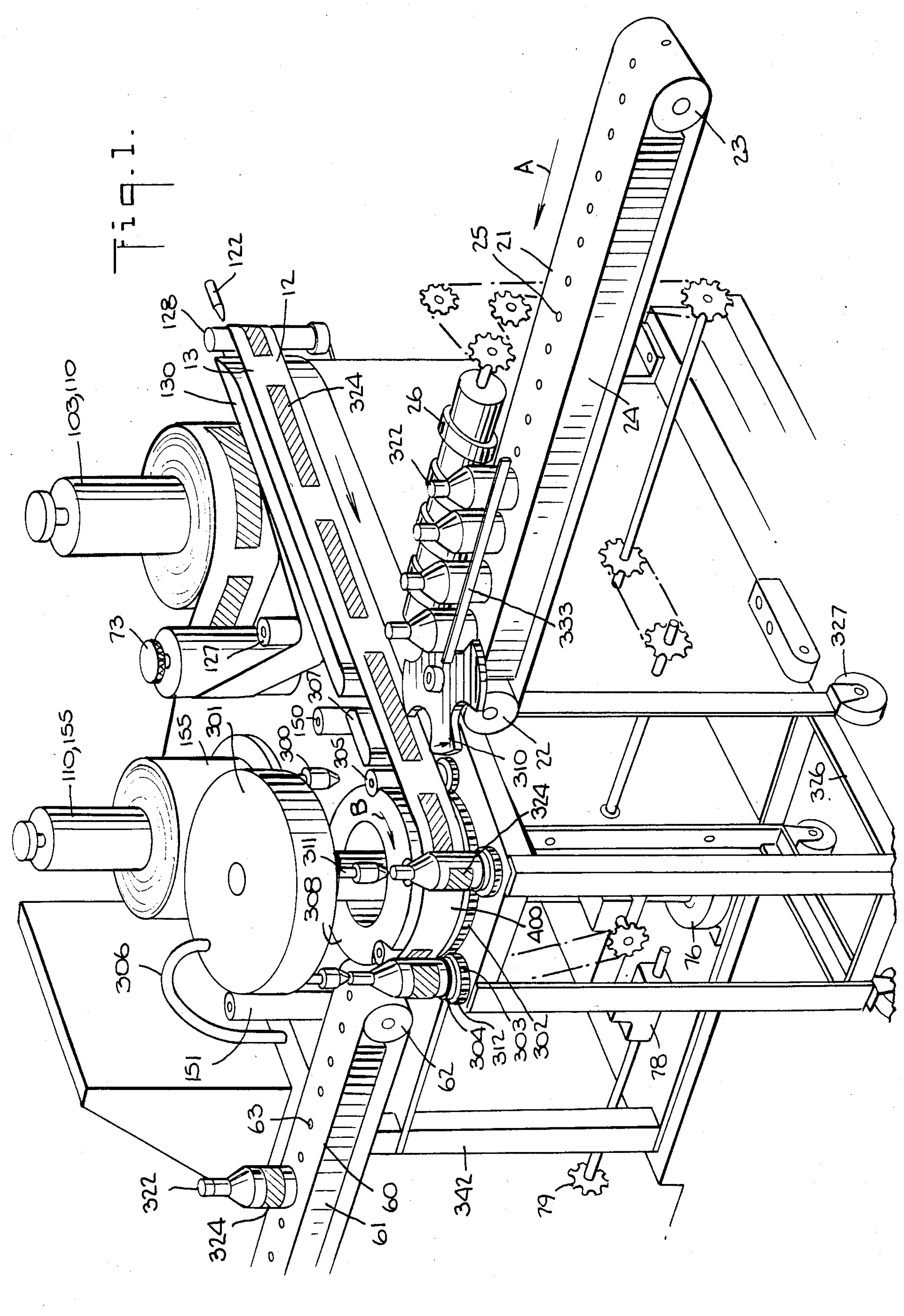
FIG. 1 shows a perspective view of a label-applying apparatus constructed in accordance with this invention.

Referring now to the drawings, and more particularly to FIG. 1, a decorating apparatus according to this invention includes an input feeder conveyor belt 21 driven by rollers 22 and 23 in direction A. Below the upper surface of the belt 21 a vacuum box 24 is disposed for drawing air through holes 25 thereby holding articles 322 on the belt. Towards the end of belt 21, a worm screw 26 cooperates with a stationary bracing bar 333, and a star wheel 310 to load articles or bottles 322 onto to a decorating station or turret described more fully below. At the decorating station, a label or decal 324 is applied to the cylindrical surface of bottle 322 being decorated, after which the decorated bottle is shifted to a discharging conveyor belt 60. Belt 60 is moved by roller 62 and is provided with another vacuum box 61 to draw air through holes 63 to hold bottles 322 on belt 60 after processing at the decorating station.

Figure 2:
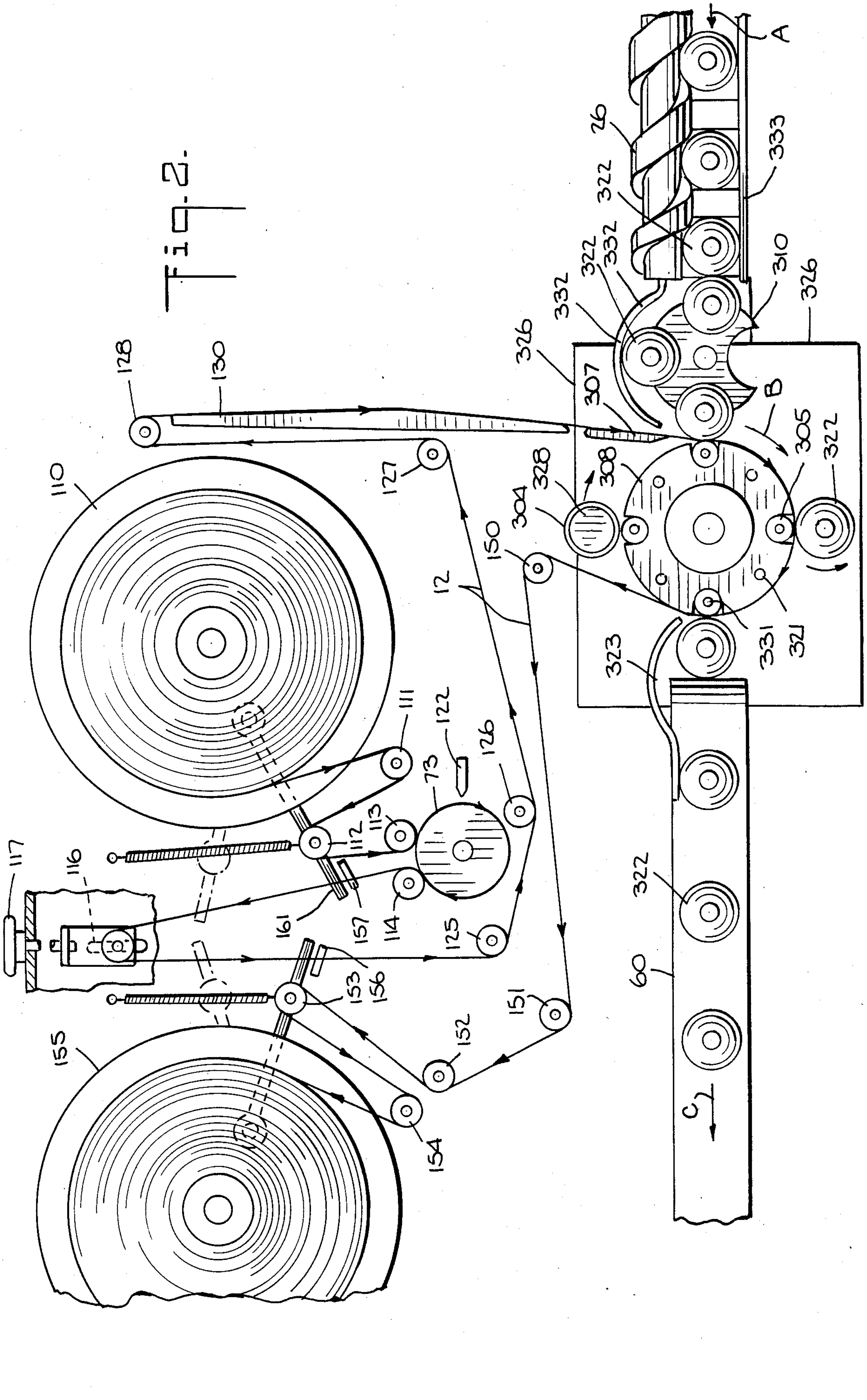
FIG. 2 shows a partial plan view of the apparatus of FIG. 1 illustrating the path of the articles processed through the label application station, and the path of the web holding the labels.
Figure 3:
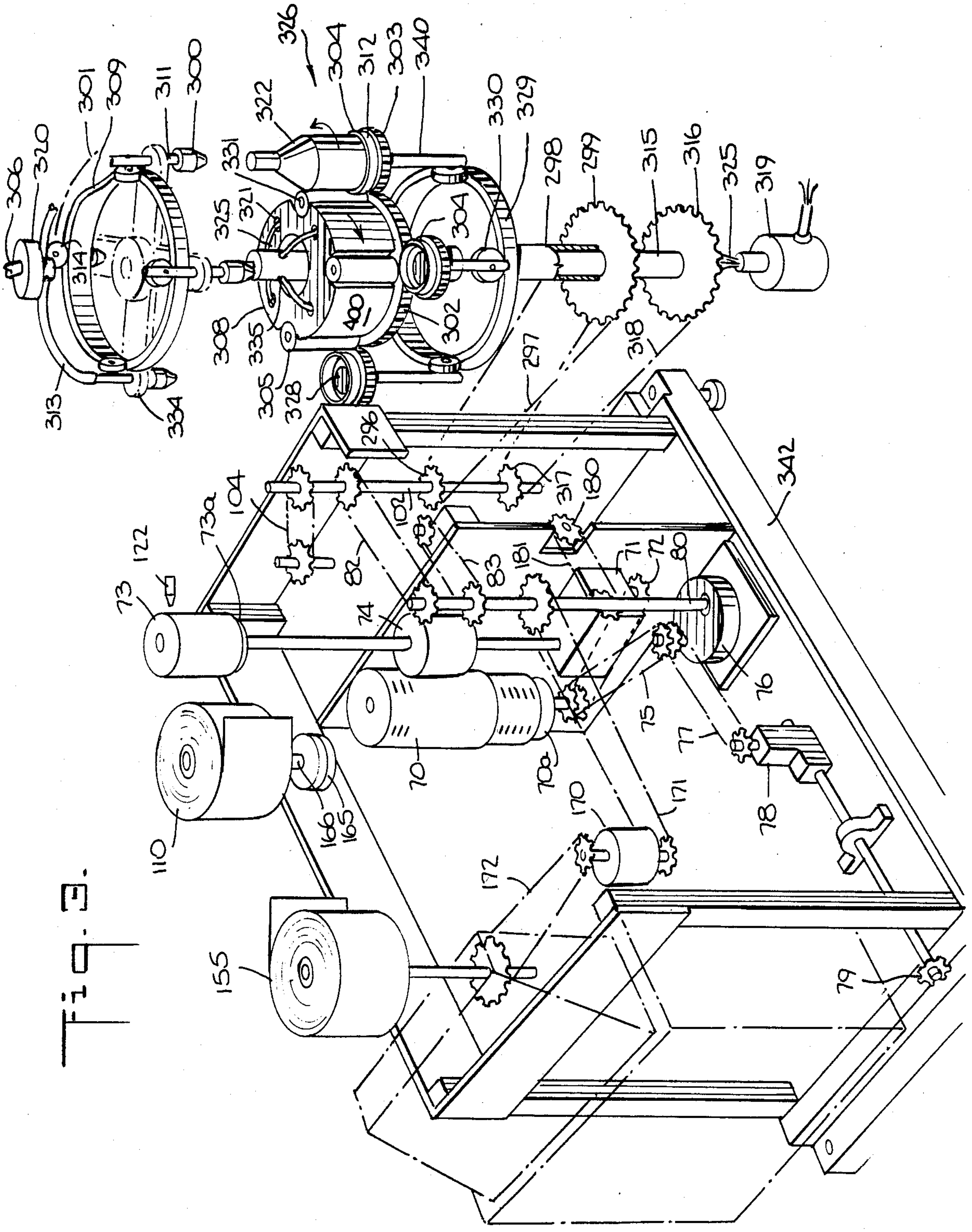
FIG. 3 illustrates a perspective view of the turret drive means in the apparatus of FIG. 1.

The turret 326, shown in detail in FIG. 3, includes a heating drum 308 which has a cylindrical outer surface 400 which is heated by heaters contained within the drum. The heaters may be, for example, electrical heaters which are connected by electric cables 325 passing through hollow shafts 298 and 315, and commutator 319 to an external electric supply. Four transfer rollers 305 are disposed within cylindrical grooves disposed made around the circumference of the drum 308. These rollers are freely rotatable on shafts 331 and are made of a resilient material. Rollers 305 have a smaller diameter than articles 322 as shown in FIG. 2. Roller shafts 331 and drum 308 are mounted or secured to a rotary shaft 315. Also mounted on the shaft 315 there are four planetary holding arms 312, each extending radially outwardly of drum 308. Each arm 312 supports a planetary gear 303 which is meshed with the teeth of a sun gear 302. Sun gear 302 is mounted on a shaft 298 which is concentric with but rotatable independently of shaft 315.

A receptacle or cup 304 is mounted on each gear 303. Each cup 304 is provided with a bottom plate 328 (shown in FIG. 3) which is vertically movable with respect to the cup. A plate stem 340 is attached to plate 328, and extends downward therefrom. At the lower end of the plate stem 340, there is mounted a cam follower wheel 330 rotatable around a horizontal axis. The wheel 330 associated with cup 304 travels around a stationary circular cam surface 329 disposed concentrically with shaft 315.

A spider arrangement 334 is disposed at the upper end of shaft 315, and holds a plurality of bottle engaging nozzles 300. Each nozzle 300 is arranged in vertical axial alignment with respect to a corresponding cup 304 and is mounted on a hollow nozzle stem 311. Each nozzle 300 is freely rotatable around the respective stem 311 with which it is associated. Each stem 311 supports a cam follower wheel 314e which rides on a second stationary circular camming surface 309 disposed concentrically with shaft 315. Each stem 311 is slidably mounted with respect to spider 334 arrangement so that the stem and the nozzle may be moved vertically. Each stem 311 is further coupled via a tube 313 to a rotating union 320 which is coupled to a regulated air supply via a stationary supply tube 306. As shown in FIG. 1, the spider 334, stems 317, pipes 313 and union 320 are covered by a protective housing 301.

In addition, the apparatus is provided with means for supplying a continuous web with a plurality of labels. More particularly, the apparatus includes a supply reel 110 and shaft 10 for holding a roll or web of labels. A re-wind reel 155 is also provided for collecting the web from the decorating station after the labels have been transferred to the bottles. As shown in detail in FIG. 2, rollers 111, 116, 125, 126, 127 and 128 are used to guide the web 12 to the decorating station or turret 326. Rollers 150, 151, 152, and 154 guide the web to the re-wind reel 155.

Rollers 153 and 112 are spring loaded and are used to tension the web. Roller 73 is a metering roller which drives the web at a predetermined speed in conjunction with an electric eye 122. Details of the metering roller and its feeding means are discussed in U.S. Pat. No. 4,019,935. Rollers 113 and 114 guide the web toward and away from roller 73. Two stationary heaters 130, 307 are used to preheat the web 12 and the labels 324 before the labels arrive at drum 308.

The reels 110, 155, heater 130 and the web-transport rollers described above are mounted on a stationary frame 342. Frame 342 also supports the discharge conveyor belt 60 as well as the mechanisms used to drive the various shafts described above. More particularly, as shown in FIG. 3, there is provided a motor 70 with a drivehead 70a which drives a speed reducer gear box 76 via chain 75. Gear box 76 engages shaft 80 which drives jack-shaft 102 via chain 82. Shaft 102 drives sprocket 317 which is coupled through chain 318 to sprocket 316 which in turn drives shaft 315. As previously mentioned, shaft 315 rotates heater drum 308, planetary arm 312 and spider 334.

Shaft 102 also has sprocket 296 which is coupled by chain 297 to sprocket 299. Sprocket 299 drives shaft 298 which rotates sun gear 302. The various sprockets and gears are arranged and constructed so that as heater drum 308 and planetary arm 312 turn by about 180° to cover the arc between the star-wheel 310 and the discharge oonveyor 60, cup 304 coupled to sun gear 302 by planetary gear 303 turns by a preselected angle around its own vertical axis. The predetermined angle is selected based on the circumference of the bottle 322 and the longitudinal length of the label to be applied. If these two dimensions are substantially equal, then the predetermined angle is 360°. As shown in FIG. 3, shafts 80 and 102 also drive various other rotating members of the device in a manner well known in the art.

Camsurface 329 is constructed and arranged so that at the point where a cup 304 is adjacent to feeder conveyor belt 21, the plate stem 340 and plate 328 are raised to allow plate 328 to accept an article or bottle being fed from conveyor belt 21. As cup 304 is rotated about shaft 315, as indicated by arrow B, surface 329 drops gradually from an upper to a lower position allowing bottom plate 328 to be lowered into cup receptacle 304. As cup 304 approaches discharge conveyor 60, cam surface 329 rises again to the upper position thereby raising bottom plate 328. The second or upper cam surface 309 is shaped in a similar manner. From a point where a nozzle 300 is adjacent to feeder conveyor 21, the surface drops gradually from an upper to a lower position allowing the nozzle 300 to be lowered thereby engaging the neck of the bottle 322. After decorating, nozzle 300 is upwardly raised near the discharge conveyor into its upper position and thereby release the bottle which has the label applied thereto.

The operation of the decorating apparatus will now be described. A plurality of articles with cylindrical surfaces such as plastic bottles 322 are placed on the feeder conveyor 21. As the bottles approach turret 326, along direction A, they are aligned and spaced by aligning bar 333 and worm screw 26. Star wheel 310 is synchronized with planetary arm 312 so that as the star wheel 310 rotates, it picks off one bottle at a time from conveyor 21 and shifts it to a cup 304. As shown in FIG. 2, sidewall 332 helps to keep the bottle engaged with the star wheel. The bottom plate 328 of this cup has been previously raised by cam surface 329 allowing a smooth transfer of the bottle 322 from the conveyor to the cup. As the bottle 322 leaves the star wheel in cup 304, the bottom plate 328 is lowered, allowing the bottle 322 to be nested securely in the cup. Acting generally concurrently with the bottom plate, nozzle 300 is lowered and engages the neck of the bottle. The nozzle 300 thus holds the bottle securely in place. Air from nozzle 300 enters the bottle under pressure and thereby serve to stiffen the cylindrical sidewall of the bottle during the application of a label thereto.

Meanwhile web 12 bearing a plurality of labels 324 is routed to the turret. Heaters 130 and 307 preheat the web 12 and labels 324, which are raised to an even higher temperature by heater drum 308, and rollers 305 which pick up heat from the drum. The labels 324 are positioned and arranged and the web is driven at a speed so that the label is fed to a press nip formed between the bottle 322 and roller 305. Because of the heat applied to the label and the web, the label is released by the web in the nip and transferred to the bottle. The label may also be coated with an adhesive which is activated by heat and which sets after the bottle is cooled thereby securing the label to the bottle. As previously mentioned, cup 304 is rotated 360° around its own shaft as it is moved from the feeder to the discharge conveyor by planetary arm 312. This simultaneous planetary motion is transmitted to the bottle, so that label 324 may be applied circumferentially all around the cylindrical sidewall of the bottle 322. Of course, if a shorter label is used, it will cover only an angular portion of the bottle. The planetary rotation of the bottle is permitted by nozzle 300 because the nozzle is also rotatable around its support stem as previously described. After the label has been applied, the bottle is released from the cup bottom plate and the nozzle. The labeled bottle 322 is then taken off from the cup by a stripper sidewall 323 and shifted to conveyor 60 which carries it off in direction C toward a filling or packing station.

Thus, labels are applied to cylindrical surfaces of the bottles in a continuous and efficient manner.

The turret 326 may be mounted on rollers 327 so that it can easily be rolled away from the conveyors (after the chains, the air pipe, and electric lines have been disconnected) to allow other operating machinery to be placed there for other purposes.

Numerous modifications will be apparent to those skilled in the art and may be made to the invention without departing from the spirit and scope thereof, particularly as defined in the appended claims.

What is claimed is:

1. An assembly for applying labels to cylindrical surfaces of articles comprising:
- a stationary frame;
- a supply reel disposed on said frame for supplying a continuous web, said web carrying a plurality of labels;
- a take-up reel for winding said continuous web after said labels have been removed;
- a turret disposed adjacent to said frame and having first and second vertical concentric shafts; a drum disposed on said first shaft for engaging said web;
- article holding means attached to said first shaft for holding an article; roller means attached to said drum to form a press nip with said article for transferring a label from said web to a cylindrical surface of said article; and planetary means having a first member disposed on said article holding means and a second member attached to said second shaft, said planetary means and said shafts cooperating to turn said article holding means around a first axis and said article and label around a second axis parallel to said first axis as said label is applied to said article;
- article feeding means for feeding articles iithout labels sequentially to said turret;
- article discharge means for discharging labeled articles from said turret;
- driving motor means; and coupling means driven by said motor and turning at least said first and second shafts.

2. The assembly of claim 1 wherein said article feeding means includes a feed conveyor for feeding articles to said turret and loading means for loading articles from said feed conveyor to said article holding means.

3. The assembly of claim 1 wherein said article discharging means includes a discharge conveyor and unloading means for transferring articles from said article holding means to said discharge conveyor.

4. The assembly of claim 3 wherein said loading means comprises a star wheel rotating around a vertical axis in synchronism with said first shaft for transferring one article from said feeding conveyor to said holding means.

5. The assembly of claim 1 wherein said holding means comprises a cup.

6. The assembly of claim 5 wherein said holding means further comprises a bottom plate disposed within said cap, and plate shifting means attached to said bottom plate for shifting said plate bottom between a first plate position and a second plate position below said first position.

7. The assembly of claim 6 wherein said plate is positioned by said shifting means into said first position when said cup and said plate are positioned for receiving said article from said article feeding means, and in said second position for holding and turning said article while said label is applied to the article.

8. The assembly of claim 7 wherein said plate shifting means returns said plate from said second position to said first position as said cup is moved to said second position to allow said discharge means to remove said article.

9. The assembly of claim 7 wherein said article has an elongated neck, said holding means further comprising neck engaging means for engaging said article neck while said label is applied.

10. The assembly of claim 9 wherein said neck engaging means comprises nozzle means for engaging said article necks, and air supply means connected to said nozzle for blowing air into said articles while said labels are applied for stiffening said articles.

11. The assembly of claim 10 further comprising nozzle shifting means for shifting said nozzle means vertically between a first nozzle position wherein said nozzle does not engage said article neck and a second position in which said nozzle means engages said article neck.

12. The assembly of claim 11 wherein said nozzle and plate shifting means are synchronized.

13. The assembly of claim, 1 further comprising preheaters disposed on said frame for preheating said labels prior to delivery to said turret to release said labels from said web.

14. The assembly of claim 1 wherein said labels are coated with a heat-activated glue for securing said labels the said articles and said drum includes heaters for activating said glue.

15. The assembly of claim 1 wherein said roller means comprises a resilient roller rotatable around a third axis in parallel with said first and second axes, said roller cooperating with said article to form a press nip for transferring said label from said web to said article.

16. The assembly of claim 1 wherein said holding means includes a planetary arm extending axially outwardly of said drum, said first member comprises a planetary gear attached to said planetary arm and said second member comprises a sun gear meshed with said planetary gear.

17. The assembly of claim 1 wherein said supply reel, take-up reel, turret, article feeding means and article discharge means operate in a continuous motion.

18. The assembly of claim 1 wherein said roller means includes several rollers for transferring labels to several articles simultaneously.

19. The assembly of claim 1 wherein said roller means includes a roller having a diameter smaller than a diameter of said article.

* * * * *

UNITED STATES PATENT AND TRADEMARK OFFICE
CERTIFICATE OF CORRECTION

PATENT NO. : 4,806,197

DATED : February 21, 1989

INVENTOR(S) : Harvey

It is certified that error appears in the above-identified patent and that said Letters Patent is hereby corrected as shown below:

Column 3, line 24 change "to a" to --a--;
line 39 delete "made"; and line 45 delete "there".
Column 4, line 14 change "10" to --103--;
line 50 change "oonveyor" to --conveyor--.
Column 5, line 8 change "release" to --releases--;
line 29 change "serve" to --serves--.
Column 6, line 30 change "iithout" to --without--;
line 54 change "cap" to --cup--.
Column 7, line 18 change "claim, 1" to --claim 1--;
Column 8, line 1 change "the said" to --to said--.

Signed and Sealed this

Twelfth Day of November, 1991

*Attest:*

HARRY F. MANBECK, JR.

*Attesting Officer* — *Commissioner of Patents and Trademarks*